United States Patent [19]
Tabei et al.

[11] Patent Number: 4,814,865
[45] Date of Patent: Mar. 21, 1989

[54] COLOR PICTURE SOLID IMAGE-PICKUP ELEMENT

[75] Inventors: Masatoshi Tabei; Kazuhiro Kawajiri, both of Kanagawa, Japan

[73] Assignee: Fuji Photo Film Co., Ltd., Kanagawa, Japan

[21] Appl. No.: 1,937

[22] Filed: Jan. 9, 1987

[30] Foreign Application Priority Data

Jan. 9, 1986 [JP] Japan ................................. 61-1289
Feb. 10, 1986 [JP] Japan ................................. 61-25950

[51] Int. Cl.$^4$ ............................................. H04N 9/077
[52] U.S. Cl. ......................................... 358/48; 358/44
[58] Field of Search .................... 358/48, 44, 41, 43

[56] References Cited

U.S. PATENT DOCUMENTS

| | | | |
|---|---|---|---|
| 4,054,915 | 10/1977 | Sugihara | 358/41 |
| 4,080,622 | 3/1978 | Sugihara | 358/44 |
| 4,151,553 | 4/1979 | Sugihara | 358/48 X |
| 4,495,516 | 1/1985 | Moore et al. | 358/44 X |
| 4,541,010 | 9/1985 | Alston | 358/44 |
| 4,553,159 | 11/1985 | Moraillon | 358/44 |

FOREIGN PATENT DOCUMENTS

| | | | |
|---|---|---|---|
| 53-079434 | 7/1978 | Japan | 358/4 |
| 55-013578 | 1/1980 | Japan | 358/43 |
| 56-158586 | 12/1981 | Japan | 358/43 |

*Primary Examiner*—James J. Groody
*Assistant Examiner*—E. Anne Faris
*Attorney, Agent, or Firm*—Sughrue, Mion, Zinn, Macpeak, and Seas

[57] ABSTRACT

A color picture solid-state pickup element comprising a solid-state image sensor and a colored matrix microfilter. The image sensor has photo elements arranged in a matrix. The horizontal lines are paired into scanning lines. The scanning lines alternate between two fields, one field being read after the other. The microfilter has rows of uniform colors, with a row covering one horizontal line. Every other row is of a first primary or complementary color. The remaining rows alternate between two other primary or complementary colors.

9 Claims, 3 Drawing Sheets

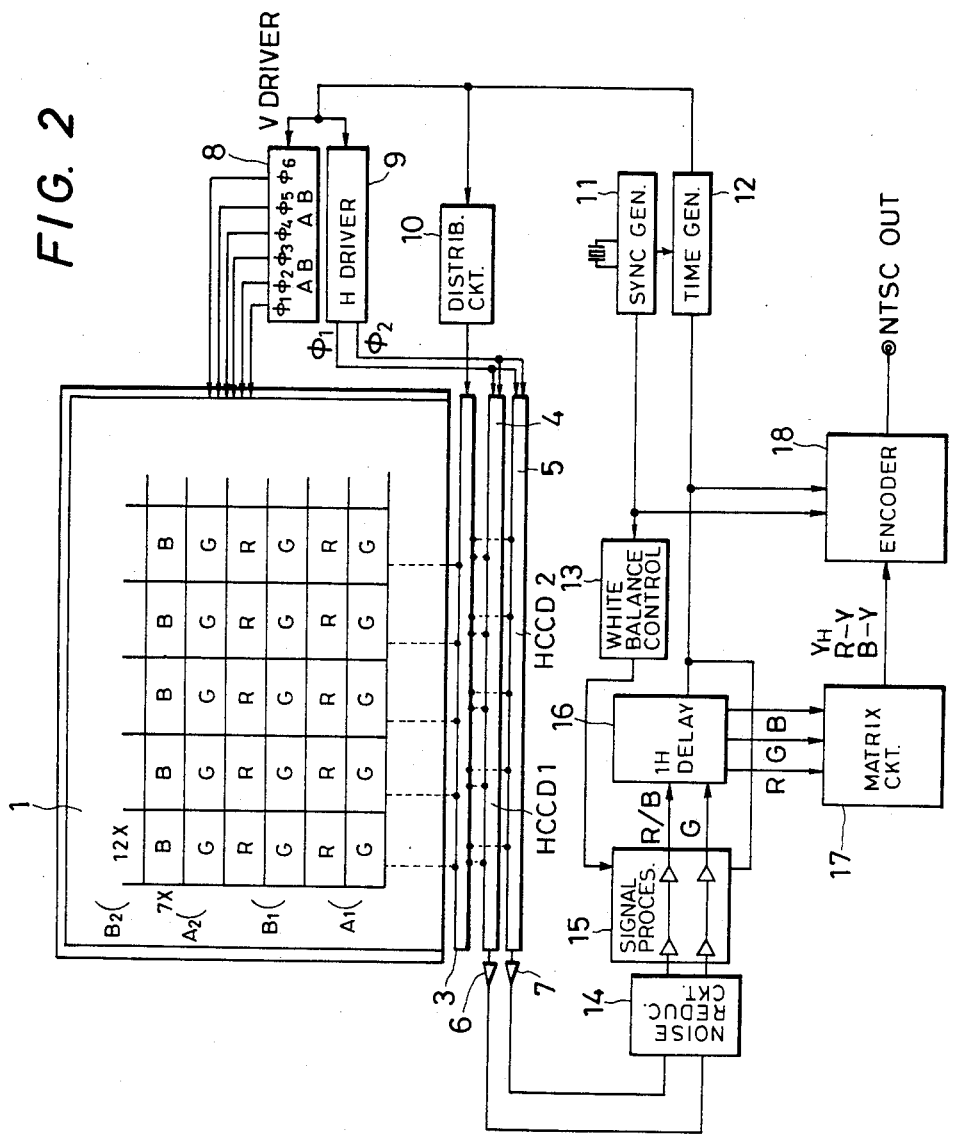

COLOR PICTURE SOLID IMAGE-PICKUP ELEMENT

BACKGROUND OF THE INVENTION

1. Field of the Invention

This invention relates to a color picture solid image-pickup element comprising: a solid image sensor including a photo-electric conversion section, a charge transfer section, and a transfer control section; and a matrix type microfilter having colored bits corresponding to picture elements and arranged on the photo-electric conversion section.

2. Background of the Invention

In general, the term "solid image sensor" and the term "solid image-pickup element" mean the same thing. However, for convenience in description, these terms will be defined as follows. The solid image sensor is used to detect only the brightness of a picture, i.e., it is used for monochromatic light. On the other hand, the solid image-pickup element is obtained by combining the solid image sensor with a microfilter, i.e., it is used for color pictures.

The above-described solid image-pickup element is well known in the art. The microfilter of the solid image-pickup element is in the form of a colored bit matrix. That is, the microfilter has colored bits of R (red), G(green), R, G, and so forth in first and second lines, fifth and sixth lines, and so forth in stated order, and has colored bits of G(green), B(blue), G, B, and so forth in third and fourth lines, seventh and eighth lines and so forth in the stated order. In the case of forming an interlacing type TV (television) picture field signal, the odd-numbered lines of the solid image-pickup element are successively read, and a 1H (one horizontal scanning period) delay line is used to obtain the signals of colors R, G and B from the picture.,signals of two lines. In this case, the luminance signal Y is formed by weighted-addition, and the color difference signals R-Y and B-Y can be formed in the same manner.

The above-described system is excellent. Although the color solid image-pickup element has substantially the same number of picture element as the monochromatic solid image sensor, the decrease in resolving power of the solid image-pickup element is minimized as it is designed for color pictures.

Owing to the recent improvement of the LSI manufacturing technique, more picture elements can be formed in one and the same chip. Therefore, if the number of picture elements are increased both in a horizontal direction and in a vertical direction and the above-described system is employed, then a color picture solid image-pickup element considerably high in resolving power can be obtained. It is apparent from a simple calculation that the color picture resolving power substantially equal to that of the monochromatic light solid image sensor can be obtained by increasing the number of picture elements by a factor of three (3). However, in a system in which, as in the case of TV pictures, the number of scanning lines is predetermined, it is difficult to increase the number of picture elements by three times.

Therefore, a variety of methods have been proposed in the art in which the number of picture elements is doubled both in a horizontal direction and in a vertical direction to obtain a resolving power equivalent to that of the monochromatic light solid image sensor.

One example of a solid image-pickup element in which the number of picture elements in a vertical direction is doubled according to the above-described system is known in the art. However, the solid image-pickup element is disadvantageous in that, since different colors are alternately arranged in each horizontal line of picture elements, the effective sampling frequency is decreased to half, and therefore the horizontal resolving power is insufficient.

SUMMARY OF THE INVENTION

Accordingly, an object of this invention is to provide a color picture solid image-pickup element whose resolving power is made substantially equal to that of the monochromatic light solid image sensor merely by doubling the number of picture elements in a vertical direction.

The foregoing object of this invention has been achieved as follows The number of scanning lines is doubled with two lines forming a scanning line Each scanning line is covered by a uniformly colored microfilter, with three primary or complementary colors covering different lines. A first color covers half the lines. Two additional colors each cover half of the remaining lines. The photocharge is transferred in parallel to two CCDs. One CCD always receives the first color signal. The other CCD alternates between the other two color signals on successive scanning lines. The CCDs are read in parallel and the color signals are combined both within a scanning line and between scanning lines of two field scanning.

BRIEF DESCRIPTION OF THE DRAWINGS

FIG. 2 is a block diagram showing peripheral circuits for obtaining NTSC TV signals from the output signals of the solid image-pickup element.

DETAILED DESCRIPTION OF THE PREFERRED EMBODIMENTS

Figure 1:
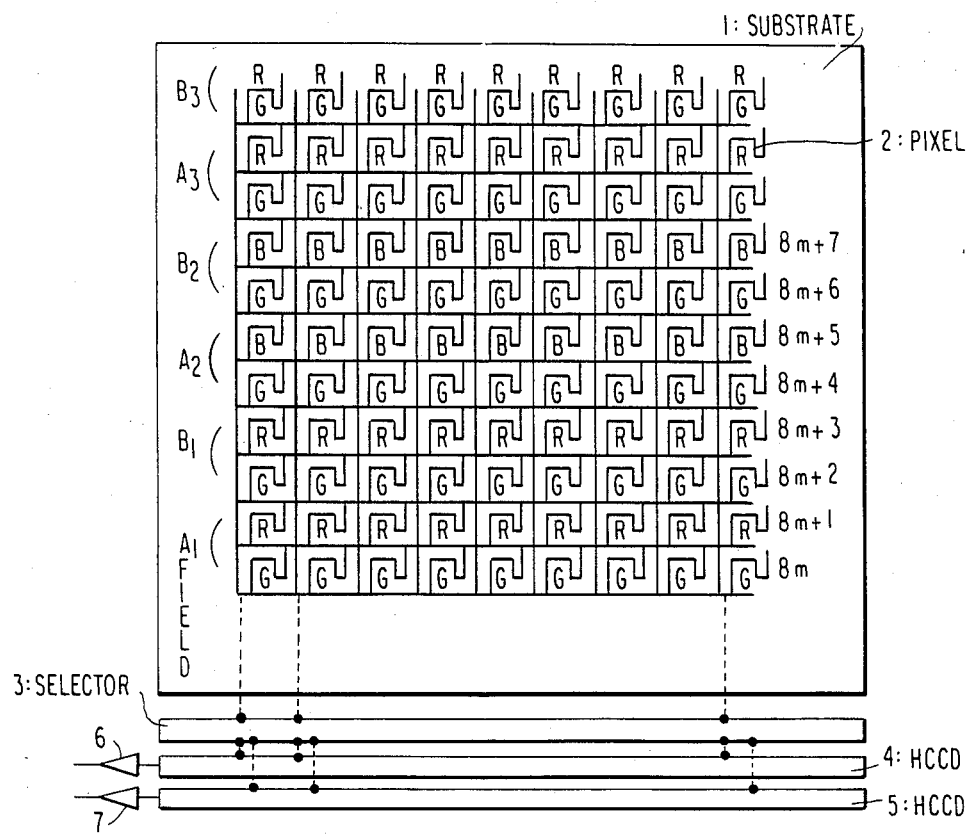
FIG. 1 is a block diagram showing a first example of a color picture solid image-pickup element of this invention.

In the first embodiment of the invention, the photoelectric conversion section has picture elements arranged in lines the number of which is twice as many as the number of scanning lines. In this case, the number of picture elements in a horizontal direction is the same as that of picture elements in the conventional case. The colored bits of the microfilter which correspond to the picture elements are arranged in such a manner that bits of the same color are arranged along a given line in the line direction. In the column direction a first one of the three primary colors or complementary colors, namely, G or W (white) appears every other line, and a second color R or Cy (cyan) and a third color B or Ye (yellow) of these primary or complementary colors occur alternately between the first colors. Furthermore, two horizontal charge transfer section are provided in such a manner that one of the horizontal charge transfer sections is used for the first color only, and the other is used alternately for the second and third colors. In addition, a 1H delay line is provided to obtain the three-primary-color signals for each scanning line.

In a second embodiment of the invention, the uniform arrangement of the colored bits of the microfilter in the horizontal direction is the same as that of the colored bits in the first embodiment. However, in the arrangement of the colored bits in the vertical direction, the color of one of two lines corresponding to an "A" field scanning line is the same as that of one of two lines corresponding to a "B" field scanning line. Furthermore, two horizontal charge transfer sections and a change-over switch are provided so as to restore the order of color signals for every field. For instance, in the microfilter, the colors G, B, B, G, G, R, R, G and so forth are assigned to the lines, respectively, in the stated order. If, as was described above, the picture elements of the first, second, fifth, sixth, . . . lines are for the "A" field, then in the scanning of the "A" field one of the horizontal CCDs outputs pictures signals of G(green) and the other alternately outputs picture signals of R(red) and B(blue) separately according to the scannings. Similarly, if the picture elements of the third, fourth, seventh, eighth, . . . lines are for the "B" field, then in the scanning of the "B" field, the one horizontal CCD alternately outputs picture signals of R and B separately according to the scanning and the other outputs pictures signals of G. This method is advantageous in that the microfilter can be set on the solid image sensor with relatively low accuracy not only in the horizontal direction but also in the vertical direction.

In the color picture solid image-pickup element according to the invention, a resolving power substantially equal to that of a conventional monochromatic light solid image sensor can be obtained merely by doubling the number of picture elements only in the vertical direction. Furthermore, in the solid image-pickup element of the invention, with respect to three colors such as R, G and B, the horizontal resolving power is uniform, and therefore the color Morié pattern scarcely occurs. In addition, the alignment of the solid image sensor with the microfilter in the horizontal direction is relatively loose, and therefore the color picture solid image-pickup element of the inventional can be manufactured readily because of this looseness.

Furthermore, in the solid image-pickup element of the invention, one color is assigned to two adjacent lines of the microfilter. Accordingly, not only the microfilter can be manufactured readily, but also the microfilter can be laid on the solid image sensor both in the horizontal direction and in the vertical direction with relatively low accuracy.

Preferred embodiments of this invention will be described with reference to the accompanying drawings.

FIG. 1 is a block diagram outlining a solid image-pickup element formed according to the invention. As shown in FIG. 1, picture elements 2 are arranged in matrix form on a substrate 1. A microfilter is placed on a photo-electric conversion section including the picture elements 2. In FIG. 1, reference characters R, G and B designate the color bits of the microfilter, namely red, green and blue. The picture elements in the lowermost two lines are for the first scanning line $A_1$ of the "A" field, those in the next two lines are for the first scanning line $B_1$ of the "B" field, those in the next two lines are for the second scanning line $A_2$ of the "A" field, those in the next two lines are for the second scanning line $B_2$ of the "B" field, and so forth. Signal charges are supplied through a vertical transfer section (not shown) successively two horizontal transfer sections 4 and 5 shown below the photo-conversion section in FIG. 1. In this operation, the "A" field signals and the "B" field signals are sorted out by a selection circuit 3. All A field lines are sequentially vertically transferred to the horizontal transfer sections 4 and 5 before the B field lines are so transferred. G signals are supplied to the horizontal transfer section 5 at all times. Depending on the field scanning lines, R signals and B signals are alternately applied to the horizontal transfer section 4. These picture signals supplied in parallel to the horizontal transfer sections 4 and 5 are outputted serially through amplifiers 6 and 7, respectively.

FIG. 2 shows the arrangement of peripheral circuits for forming NTSC TV signals by utilizing the output signals of the solid image-pickup element. The signal charges formed in the photo-electric conversion section 2 are shifted vertically adjacent to the picture elements 2 of the photo conversion section by a "V" driver 8 in the transfer control section. The signal charges thus shifted are supplied to the horizontal transfer sections 4 and 5 through the selection circuit 3 which is under the control of a distribution circuit 10.

As a result, the G signals of one scanning line are stored in the horizontal transfer section 5, while the R signals and the B signals are alternately stored in the horizontal transfer section 4 separately according to the scanning lines. These color signals are supplied through the above-described amplifiers 6 and 7 and a noise reducer circuit 14 to a signal processing circuit 15. In this operation, the signals in the horizontal transfer sections 4 and 5 are successively shifted by the "H" driver 9 in the transfer control section.

In the signal processing circuit 15, AGC (automatic gain control), γ-value correction, and white balance control are carried out. The G signal, and the R or B signal outputted by the signal processing circuit 15 are supplied to a 1H delay line 16, where they meet the B or R signal of the preceding scanning line. Therefore, the complete R, G and B signals are provided by the 1H delay line 16. The R, G and B signals are supplied to a matrix circuit 17, where the γ-value correction is carried out and they are converted into color difference signals $Y_H$, R-Y, and B-Y. These color difference signals are applied to an encoder 18, where they are added to a timing signal and a synchronizing signal to form an NTSC TV signal.

Furthermore, as shown in FIG. 2, a synchronizing signal generator 11 and a timing signal generator 12 are provided. The synchronizing signal generator 11 operates to add the synchronizing signal to the picture signal with the aid of the encoder 18 and to supply the synchronizing signal, as a reference value, to the white balance control circuit 13. The timing signal generator 12 operates to add the timing signal to the picture signal with the aid of the encoder 18 and to supply the timing signal to the signal processing circuit 15, the 1H delay line 16, and the transfer control section 8 and 9.

Figure 3:
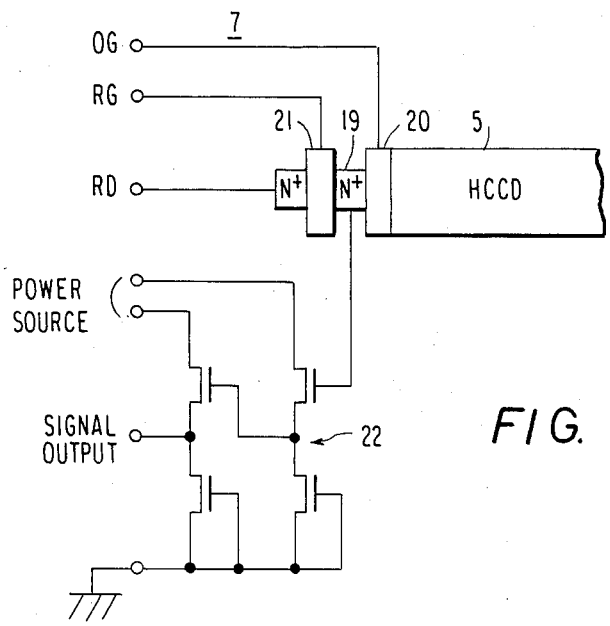
FIG. 3 is a diagram showing one example of a signal charge reading amplifier.

FIG. 3 shows one example of the amplifier 7 adapted to read the signal charges out of the horizontal transfer section 5. It goes without saying that the amplifier 6 is similar in construction to the amplifier 7. In the example, the charge transfer section 5 is of the CCD type, and therefore the first stage of the amplifier 7 is a conventional floating diffusion amplifier. As shown in FIG. 3, a floating diffusion 19 is arranged between output gates 20 and 21. The floating diffusion 19 is adapted to convert the signal charge into a voltage, which is amplified by an ordinary transistor amplifier 22.

In the above-described embodiment, the microfilter of the primary colors R, G and B are employed. However, it is obvious to those skilled in the art that the technical concept of the invention is applicable to the case where the complementary colors Cy, W and Ye are employed.

In the above-described embodiment, the microfilter can be laid on the image sensor with relatively low accuracy in the horizontal direction, but the microfilter must be laid on the image sensor with considerably high accuracy in the vertical direction. However, this problem can be solved by the following embodiment of the invention.

Figure 4:
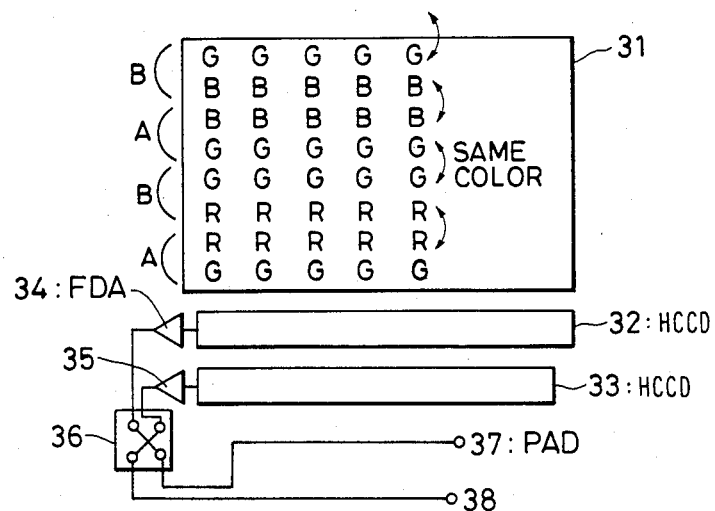
FIG. 4 is a block diagram showing a second example of the color picture solid image-pickup element.
Figure 5:
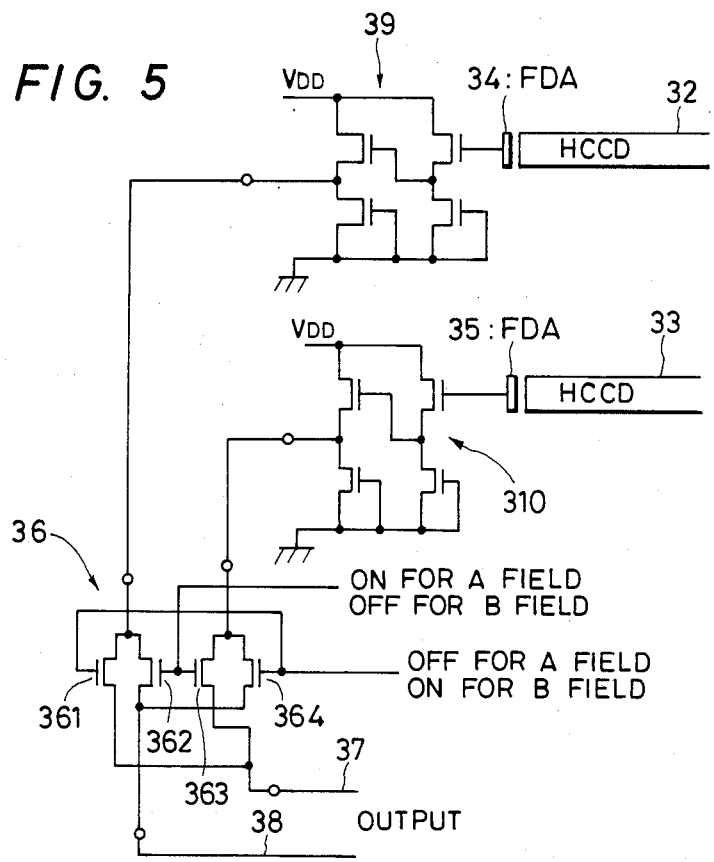
FIG. 5 is a circuit diagram showing one example of a change-over switch in the solid image-pickup element shown in FIG. 4.

FIG. 4 shows a microfilter 31. In FIG. 4, reference characters R, G and B designates the colors of the elements of the microfilter 31. FIG. 4 shows only eight (8) color lines; however, it should be noted that the color lines are followed by color lines arranged in the same order.

A photo-electric conversion circuit (not shown) and a vertical charge transfer section (not shown) are arranged below the microfilter 31. The elements of the photoelectric conversion section confront the color regions R, G and B of the filter 31, respectively, similarly to the embodiment of FIG. 2.

The charge signals of two color lines are read into horizontal CCDs 32 and 33, respectively, during every horizontal scanning line period (about 63.5 microseconds in the embodiment). And during the period, these signals are, in a parallel mode, read out of the CDDs 32 and 33. In FIG. 4, reference characters A and B on the left-hand side of the microfilter 31 designate the "A" and "B" fields, respectively. For instance during the "A" field period, the R signals and the B signals are alternately and separately written into the horizontal CCD 32 according to the scanning lines. On the other hand, the G signals are all written into the horizontal CCD 33. In the embodiment, the signals stored in the horizontal CCDs 32 and 33 are outputted through floating diffusion amplifiers (FDA) 34 and 35, respectively Similarly, during the "B" field period, the G signals are written in the horizontal CCD 32, while the R signals and the B signals are alternately read into the CCD 33 separately according to the scanning lines The floating diffusion amplifiers 34 and 35 adapted to read the signals out of the CCDs 32 and 33 respectively are connected to a change-over switch 36. The change-over switch 36 is switched once every A or B field, so that the G signal is provided at one output terminal 37, and the R signal and the B signal are alternately provided at the other output terminal 38 separately according to the scanning line The output terminal 38 is connected to another change-over switch, similar to half of the switch 36. The change-over switch is changed once every scanning line, so that the R signal and the B signal can be separately delivered out. That is, all of the R, B and G signals are separately delivered out.

In the above-described second embodiment, the three primary colors R, G, and B are employed However, it goes without saying that the technical concept of the invention is applicable to the case where the combination of the colors W, Cy and Ye, the combination of the colors W, R and B or the combination of G, Cy and Ye is employed. That is any combination of colors can be employed if all the colors can be reproduced by addition and subtraction of the color signals or conversion into complementary colors.

As is apparent from the above description, in the color picture solid image-pickup element according to the invention, merely by doubling the number of picture elements only in the vertical direction, the resolving power is made substantially equal to that of the monochromatic light solid image sensor. Furthermore, in the solid image-pickup element, three colors such as R, G, and B are uniformly arranged in the horizontal direction. Therefore, the color Morie pattern scarcely occurs, and the alignment of the micro-filter with the solid image sensor may be low in accuracy.

What is claimed is:

1. A color picture solid image-pickup element, comprising:

a solid imaging sensor including a photo-electric conversion section of a plurality of photo-electric elements arranged in a matrix of first horizontal lines and columns, an overall charge transfer section comprising two horizontal charge transfer sections receiving signals from photo-electric elements in odd- and even-numbered first horizontal lines, respectively, a transfer control section controlling said horizontal charge transfer sections, and means for reading substantially half of said first horizontal lines of said matrix firstly in a first one of two fields and then reading substantially another half of said first horizontal lines in a second one of said fields, said first horizontal lines being arranged in neighboring pairs of first horizontal lines constituting a scanning line for each field, said neighboring pairs alternating in said matrix for said two fields; and a matrix-type microfilter having colored bits in matrix form in correspondence to said photo-electric elements and arranged on said photo-electric conversion section;

wherein said colored bits are arranged in second horizontal lines, corresponding to said first horizontal lines of said photo-electric conversion section, of substantially uniform color of said colored bits, said colored bits having selected ones of three different colors selected from primary and complementary colors, one second horizontal line in correspondence to an even-numbered scanning line of each of said fields having colored bits of a first of said three colors, another second horizontal line in correspondence to said even-numbered scanning line having colored bits of a second of said three colors, one second horizontal line in correspondence to an odd-numbered scanning line of each of said fields having colored bits of said first color, and another second horizontal line in correspondence to said odd-numbered scanning line having colored bits of a third of said three colors; and wherein said reading means and said charge transfer section cause a first one of said horizontal transfer sections to receive signals only from photo-electric elements corresponding to colored bits of said first color and a second one of said horizontal transfer sections to receive signals only from photo-electric elements corresponding in alternate times to colored bits of said second and third colors.

2. An image-pickup element as recited in claim 1, wherein said colored bits are arranged in a column direction transverse to said horizontal lines so that colored bits of said first color are disposed in every other horizontal line of said microfilter and colored bits of said second and third colors alternate in the remaining horizontal lines of said microfilter.

3. An image-pickup as recited in claim 2, wherein said overall charge transfer section further comprises a delay circuit having a delay equal to a reading period of said horizontal transfer sections for receiving an output of said two horizontal transfer circuits and for producing three independent color signals from said outputs over two of said reading periods.

4. A color picture solid image-pickup element, comprising:
a solid imaging sensor including a photo-electric conversion section of a plurality of photo-electric elements arranged in a matrix of first horizontal lines and columns, an overall charge transfer section comprising two horizontal charge transfer sections respectively receiving signals from photo-electric elements in odd- and even-numbered first horizontal lines, a transfer control section controlling said horizontal charge transfer sections, and means for reading all of said first horizontal lines of said matrix firstly in two consecutive fields, said first horizontal lines being arranged in neighboring pairs of horizontal line constituting a scanning line for each field, said neighboring pairs alternating in said matrix for said two fields; and
a matrix-type microfilter having colored bits in matrix form in correspondence to said photo-electric elements and arranged on said photo-electric conversion section;
wherein said colored bits are arranged in second horizontal lines, corresponding to said first horizontal lines of said photo-electric conversion section, of substantially uniform color of said colored bits, said colored bits having selected ones of three different colors selected from primary and complementary colors, one second horizontal line in correspondence to an even-numbered scanning line of each of said fields having colored bits of a first of said three colors, another second horizontal line in correspondence to said even-numbered scanning line having colored bits of a second of said three colors, one second horizontal line in correspondence to an odd-numbered scanning line of each of said fields having colored bits of said first color, and another second horizontal line in correspondence to said odd-numbered scanning line having colored bits of a third of said three colors;
wherein said reading means and said charge transfer section cause a first one of said horizontal transfer sections to receive signals only from photo-electric elements corresponding to colored bits of said first color and a second one of said horizontal transfer sections to receive signals only from photo-electric elements corresponding to alternate lines to colored bits of said second and third colors; and
wherein adjacent horizontal lines of said microfilter corresponding to adjacent scanning lines of different fields have colored bits of a same one of said three colors.

5. An image-pickup as recited in claim 4, wherein said overall charge transfer section further comprises a change-over switch receiving outputs of said horizontal transfer section and controlled by said reading means to switch after scanning each of said fields, said change-over switch restoring an order of color signals transferred by said overall charge transferring section.

6. An image-pickup as recited in claim 5, wherein said overall charge transferring section further comprises floating diffusion amplifiers for amplifying said outputs of said horizontal transfer section and interposed between said horizontal transfer section and said change-over switch.

7. A color picture solid image-pickup element, comprising:
a solid imaging sensor and a matrix-type microfilter;
wherein said sensor comprises:
a photo-electric conversion section of a plurality of photocells arranged in a matrix along rows and columns, said rows being arranged so that adjacent rows constitute a scanning line, adjacent scanning lines being assigned alternately to a first field and to a second field;
a transfer section comprising first and second horizontal shifters respectively receiving signals from photocells in odd-numbered and even-numbered rows;
a transfer control section controlling transfer of signals through said transfer section; and
a reading control section controlling transfer of signals from said photocells to said transfer section such that substantially a first half of said rows are read in said first field and then substantially a second half of said rows are read in said second field; and
wherein said microfilter comprises a plurality of colored bits arranged in consecutively numbered microfilter rows of respective uniform color arranged in correspondence to said rows of said conversion section, said color of said bits being selected from three different colors, said colors of said microfilter rows being selected such that:
a first one of an 8mth and an 8m+1st microfilter rows and a first one of an 8m+2th and an 8m+3rd microfilter rows have colored bits of a first of said three colors;
a second one of said 8mth and 8m+1st microfilter rows and a second one of said 8m+2th and 8m+3rd microfilter rows have colored bits of a second of said three colors;
a first one of an 8m+4th and an 8m+5th microfilter rows and a first one of an 8m+6th and an 8m+7th microfilter rows have colored bits of said first color; and
a second one of said 8m+4th and 8m+5th microfilter rows and a second one of said 8m+6th and 8m+7th microfilter rows have colored bits of a third of said colors, wherein m is an integer.

8. A color picture solid image-pickup element as recited in claim 7, wherein said 8mth, 8m+2nd, 8m+4th and 8m+6th microfilter rows have colored bits of said first color, said 8m+1st and 8m+3rd microfilter rows have colored bits of said second color and said 8m+5th and said 8m+7th microfilter rows have colored bits of said third color.

9. A color picture solid image-pickup element as recited in claim 7, wherein said 8mth, 8m+3rd, 8m+4th and 8m+7th microfilter rows have colored bits of said first color, said 8m+1st and 8m+2nd microfilter rows have colored bits of said second color and said 8m+6th and 8m+7th microfilter rows have colored bits of said third color.

* * * * *